United States Patent
Jaffrey

(10) Patent No.: US 9,732,879 B2
(45) Date of Patent: Aug. 15, 2017

(54) SENSOR ASSEMBLY FOR MONITORING A FLUID EXTRACTION COMPONENT

(71) Applicant: Cameron International Corporation, Hosuton, TX (US)

(72) Inventor: Andrew Jaffrey, Oldmeldrum (GB)

(73) Assignee: Cameron International Corporation, Houston, TX (US)

( * ) Notice: Subject to any disclaimer, the term of this patent is extended or adjusted under 35 U.S.C. 154(b) by 154 days.

(21) Appl. No.: 14/850,378

(22) Filed: Sep. 10, 2015

(65) Prior Publication Data

US 2017/0074420 A1    Mar. 16, 2017

(51) Int. Cl.
| | |
|---|---|
| *E21B 47/00* | (2012.01) |
| *F16K 37/00* | (2006.01) |
| *E21B 33/064* | (2006.01) |
| *E21B 47/06* | (2012.01) |
| *E21B 47/12* | (2012.01) |
| *G01D 5/14* | (2006.01) |
| *G01C 15/00* | (2006.01) |

(52) U.S. Cl.
CPC ........ *F16K 37/0083* (2013.01); *E21B 33/064* (2013.01); *E21B 47/00* (2013.01); *E21B 47/06* (2013.01); *E21B 47/065* (2013.01); *E21B 47/12* (2013.01); *G01D 5/142* (2013.01); *G01C 15/00* (2013.01)

(58) Field of Classification Search
None
See application file for complete search history.

(56) References Cited

U.S. PATENT DOCUMENTS

2011/0209875 A1* 9/2011 Crome .............. E21B 43/0107
166/339
2011/0248846 A1  10/2011 Belov et al.
(Continued)

FOREIGN PATENT DOCUMENTS

| GB | WO 0186114 A1 * | 11/2001 | ............. B01D 17/00 |
| GB | WO 03106887 A1 * | 12/2003 | ........... F16K 5/0605 |
| WO | 2005080744 A1 | 9/2005 | |

OTHER PUBLICATIONS

International Search Report and Written Opinion issued in corresponding application No. PCT/US2016/046468, dated Nov. 16, 2016, 18 pgs.

*Primary Examiner* — Andre Allen
(74) *Attorney, Agent, or Firm* — Chamberlain Hrdlicka

(57) ABSTRACT

The present disclosure relates to monitoring the condition of fluid extraction components associated with a subsea hydrocarbon drilling and production operation and, in an embodiment described herein, more particularly provides a sensor assembly for monitoring the extraction component which is easily installable and locally powered. The sensor assembly, in one embodiment, is contained on a patch. The assembly comprises a sensor, a power supply, and a communication device, all located on the patch. The patch can be easily coupled to fluid extraction components, such as a valve associated with a blowout preventer stack. The patch can include a coupling material on one side of the patch allowing the patch to adhere to the fluid extraction components. The patch can further include a power generator, such as a piezoelectric generator, thereby allowing for the sensor assembly to be locally powered.

20 Claims, 5 Drawing Sheets

(56) References Cited

U.S. PATENT DOCUMENTS

| | | | |
|---|---|---|---|
| 2012/0259552 A1* | 10/2012 | Wingate | E21B 47/10 |
| | | | 702/13 |
| 2013/0126153 A1 | 5/2013 | Baker | |
| 2013/0283917 A1 | 10/2013 | Coonrod et al. | |
| 2014/0123746 A1 | 5/2014 | Jaffrey et al. | |
| 2014/0174552 A1* | 6/2014 | Gustafson | F16K 17/06 |
| | | | 137/14 |
| 2014/0299801 A1* | 10/2014 | Alred | E21B 33/0355 |
| | | | 251/62 |
| 2016/0273355 A1* | 9/2016 | Gosney | B01D 19/0078 |

* cited by examiner

SENSOR ASSEMBLY FOR MONITORING A FLUID EXTRACTION COMPONENT

BACKGROUND

This section is intended to provide the reader with background information to facilitate a better understanding of the various aspects of the present embodiments. Accordingly, it should be understood that these statements are to be read in this light, and not as admissions of prior art.

In modern hydrocarbon drilling and production operations, there is an ever-increasing need to add more sensors and instrumentation to equipment or components at or near the wellhead. However, the installation of additional sensors and instrumentation with subsea hydrocarbon drilling and production operations raises challenges regarding the infrastructure needed to supply power and handle communications to and from these sensors and instrumentation.

More particularly, installing a sensor to a fluid extraction component associated with subsea hydrocarbon drilling and production operations typically requires installation of several sensing components, including the sensor itself, a power supply for the sensor to operate, and a means for collecting data generated by the sensor. Each of these components occupies valuable physical space on the subsea equipment. In addition, there are costs associated with installation of each component, both in terms of labor and capital expenditure. These costs can be significant, particularly where sensors are being retrofitted to the fluid extraction components and labor demands are high. Further, since subsea conditions can be hostile, minimizing the number and size of equipment near a well, such as wires traversing the equipment or external batteries, is a common objective.

Presently, operation of valves, such as valves in a blowout preventer control pod, is inferred from other measurements, but is not available as a direct measurement. Accordingly, there is a need for a sensor assembly which is readily installable on a subsea fluid extraction system and locally powered while minimizing the number and size of additional pieces of equipment required.

BRIEF DESCRIPTION OF THE DRAWINGS

Illustrative embodiments of the present disclosure are described in detail below with reference to the attached drawing figures, which are incorporated by reference herein and wherein.

Figure 1:
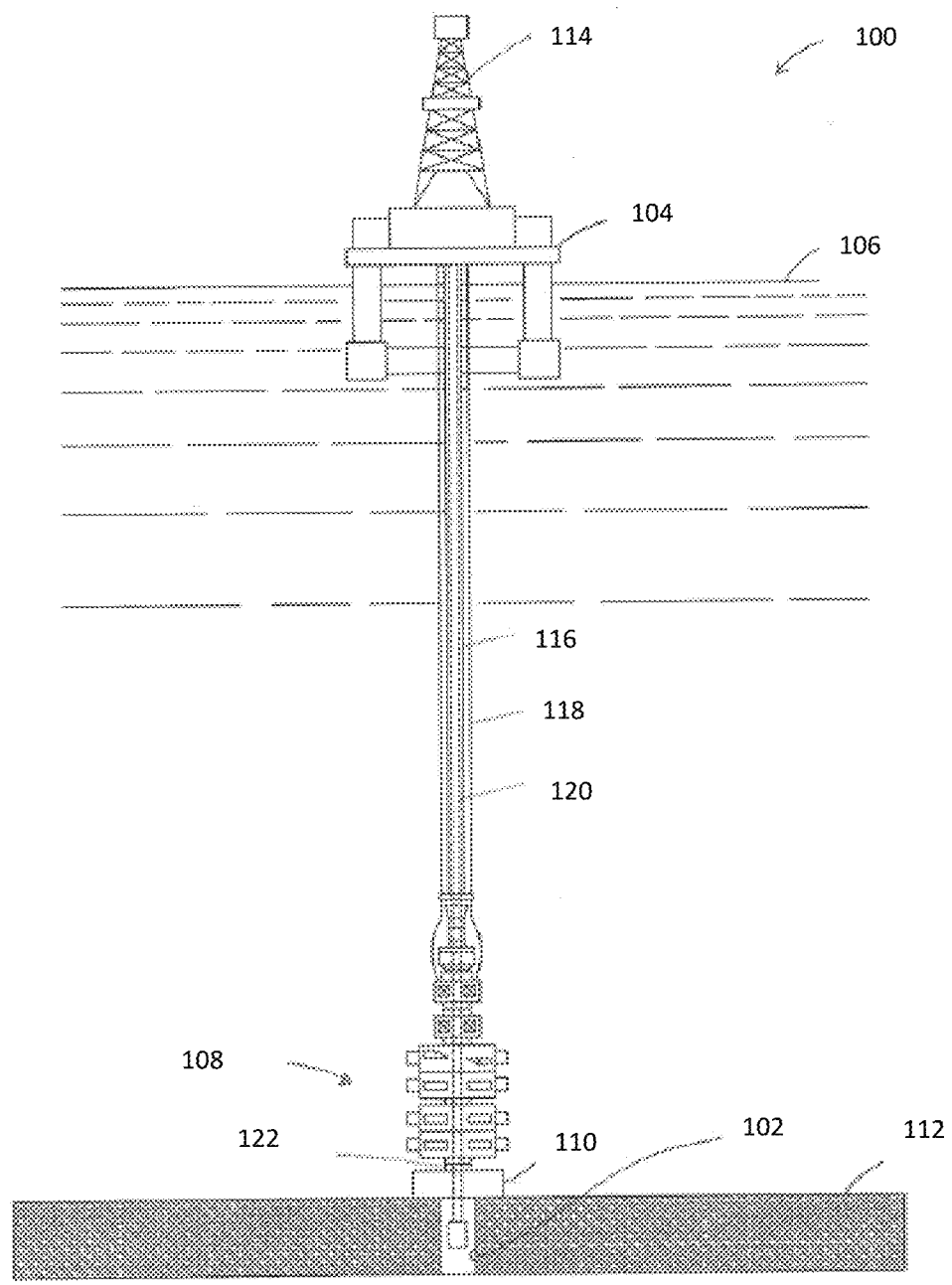
FIG. 1 is a schematic view of an example drilling system.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

The following discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

The present disclosure relates generally to monitoring the condition of fluid extraction components associated with a subsea hydrocarbon drilling and production operations and, in an embodiment described herein, more particularly provides an integrated sensor assembly, which is easily installable and locally powered, for monitoring the extraction component. The sensor assembly, in one embodiment, is contained on a single unit or base layer, such as a patch. The assembly comprises a sensor, a power supply, and a communication device, all located on the patch. The patch can be easily coupled to fluid extraction components, such as a valve associated with a blowout preventer stack. The patch can include a coupling material on one side of the patch allowing for the patch to adhere to the fluid extraction components. The patch can further include a power generator layer including a piezoelectric material which produces electrical charge in response to seawater pressure at depth, thereby allowing for the sensor assembly to be locally powered.

Referring now to FIG. 1, an embodiment of an offshore system 100 for drilling and/or producing a wellbore 102 is shown. In this embodiment, the system 100 includes an offshore vessel or platform 104 at the sea surface 106 and a subsea blowout preventer ("BOP") stack assembly 108 mounted to a wellhead 110 at the sea floor 112. The platform 104 is equipped with a derrick 114. A tubular drilling riser 116 extends from the platform 104 to the BOP stack assembly 108. The drilling riser 116 returns drilling fluid or mud to the platform 104 during drilling operations. One or more hydraulic conduits 118 extend along the outside of the riser 116 from the platform 104 to the BOP stack assembly 108. The conduits 118 supply pressurized hydraulic fluid to the BOP assembly 108.

Figure 2:
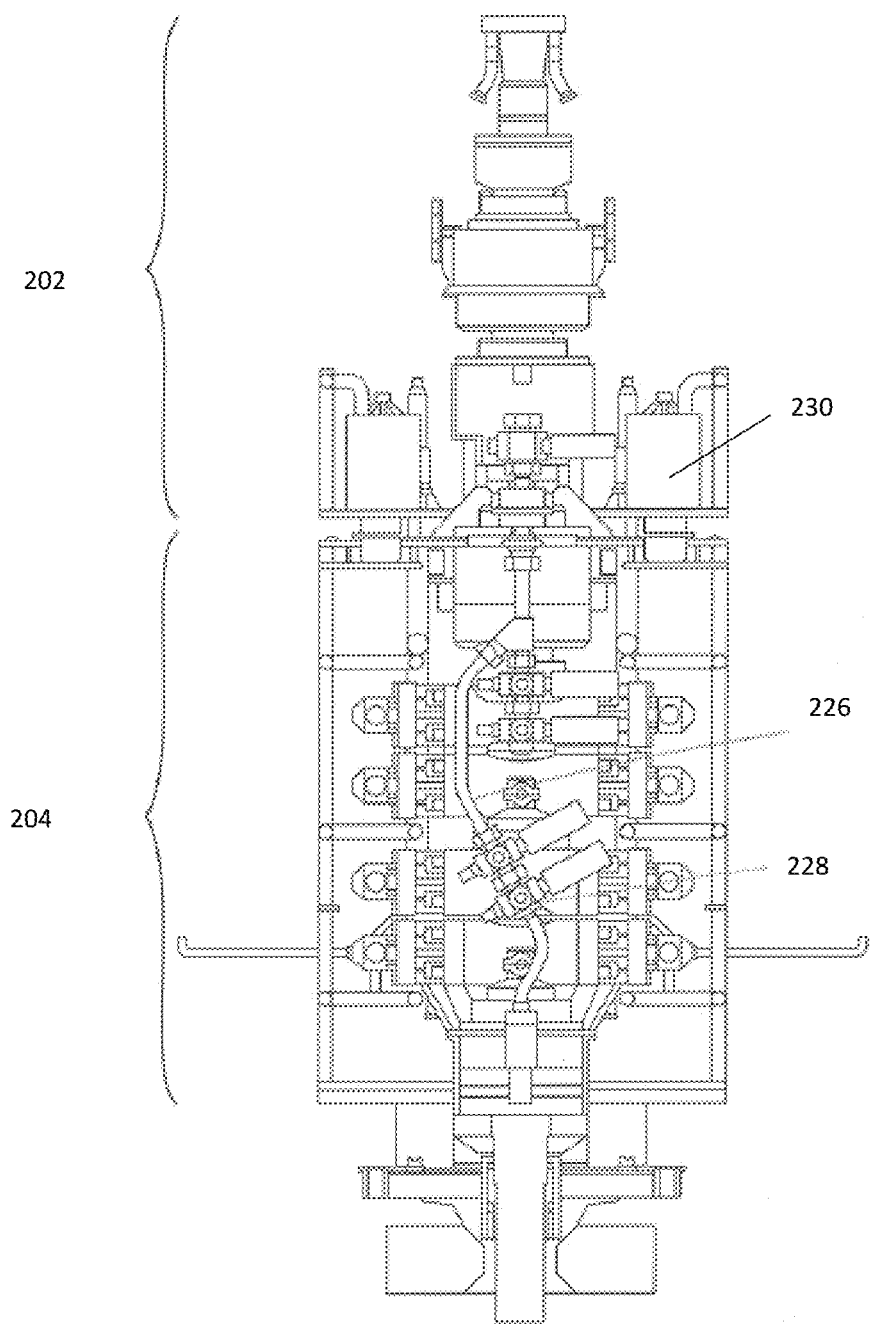
FIG. 2 is a front elevation view of a blowout preventer stack and lower marine riser package.

Referring now to FIGS. 1 and 2, the BOP stack assembly 108 is mounted to the wellhead 110 and is designed and configured to control and seal the wellbore 102, thereby containing the hydrocarbon fluids (liquids and gases) therein. In this embodiment, the BOP stack assembly 108 comprises a lower marine riser package ("LMRP") 202 and a BOP or BOP stack 204.

The BOP stack 204 is releasably secured to the wellhead 110 as well as the LMRP 202. Likewise, the LMRP 202 is releasably secured to the BOP stack 204 and the riser 116. In this embodiment, the connections between the wellhead 110, the BOP stack 204, and the LMRP 202 include hydraulically actuated, mechanical wellhead-type connections 122. In general, the connections 122 may comprise any suitable releasable wellhead-type mechanical connection such as the DWHC or HC profile subsea wellhead system available from Cameron International Corporation of Houston, Tex., or any other such wellhead profile available from several subsea wellhead manufacturers. Typically, such hydraulically actuated, mechanical wellhead-type connections (e.g., connections 122) include an upward-facing male connector, or "hub," that is received by and releasably engages a downward-facing mating female connector or receptacle. In this embodiment, the connection between LMRP 202 and the riser 116 is a flange connection that is remotely controlled, just as the connections 122 may be remotely, hydraulically controlled.

The blowout preventer assembly 108 contains hydraulic conduits or piping 226 for conveying hydraulic fluid throughout the assembly. In FIG. 2, the illustrated hydraulic conduits 226 are limited in number for ease of viewing and explanation. However, it is known to those of ordinary skill in the art that a blowout preventer assembly and its associated control system may comprise numerous hydraulic conduits for distributing hydraulic fluid to a number of points on the blowout preventer. Further, a blowout preventer assembly may comprise numerous actuatable devices, such as to a valve on a blowout preventer control pod, such as control pod 230. The present disclosure is directed to conveniently installable sensor assemblies for monitoring a characteristic of various components on a fluid extraction component.

Figure 3:
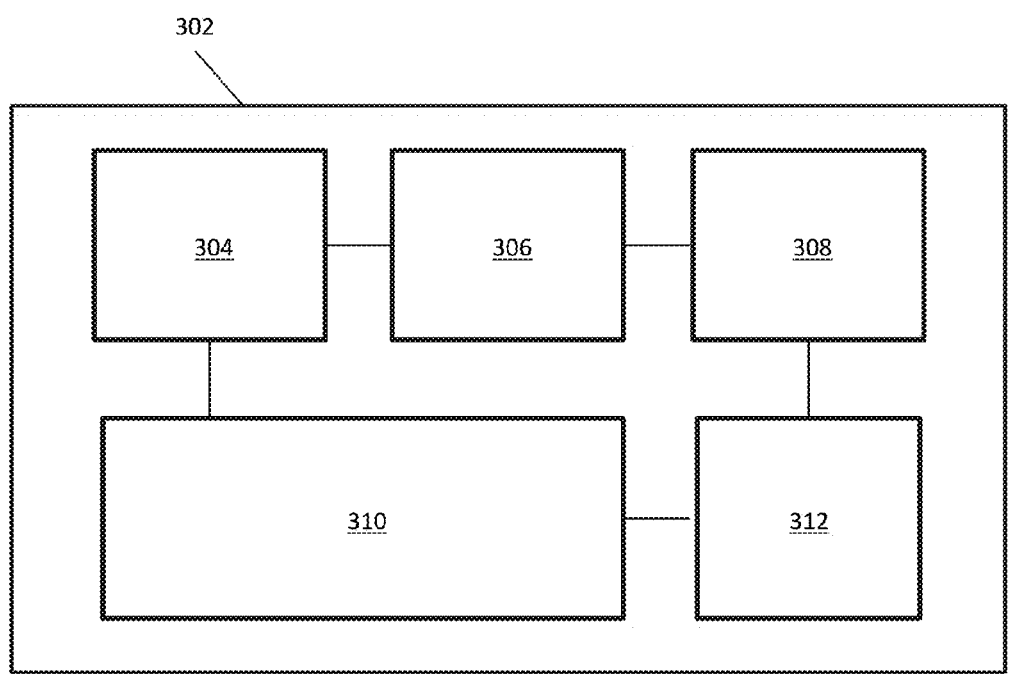
FIG. 3 is a schematic view of a base layer for a sensor assembly for use with fluid extraction component.

Turning now to FIG. 3, a schematic view of a base layer 302 for a sensor assembly for use with fluid extraction component is shown by way of example and not to scale. In the illustrated embodiment, the base layer 302 is shown as having a rectangular geometry. However, base layer 302 can be of any geometry and be constructed of any material suitable for receiving electronic components. The base layer may be formed of any suitable material such as the FR-4 glass epoxy often used in the manufacture of printed circuit boards (PCB). The coupling layer may comprise any suitable adhesive designed for prolonged immersion in sea water such as a single-component silicone adhesive or two-component polyurethane adhesive.

Base layer 302 can include a variety of components, including a sensor or sensors 304 configured to monitor a characteristic of a fluid extraction component, such as a valve associated with a control pod of a blowout preventer assembly, such as blowout preventer assembly 120 illustrated in FIGS. 1 and 2. Sensor(s) 304 measures a characteristic of the fluid extraction component and generates measurement data. Sensor 304 can be any type of sensor for monitoring a characteristic of the component. One suitable type of sensor is a Hall-Effect sensor. Other types of sensors could also be incorporated for detecting various characteristics of the component, such as, for example, temperature, pressure, strain, etc.

Base layer 302 further includes a storage device 306 configured to receive and store the measurement data generated by sensor 304. Base layer 302 also includes a radio frequency identification ("RFID") tag 308. RFID tag 308 includes a communication device, such as an antenna, and is configured to wirelessly transmit measurement data generated by sensor 304 and/or stored by storage device 306 to a remote location. The remote location can be a remotely operated vehicle ("ROV") or autonomous underwater vehicle including a receiver configured to receive the transmitted measurement data. In addition, the remote location can include a surface location (e.g., on a rig or vessel) including a receiver configured to receive the transmitted measurement data. The RFID tag can include data identifying the particular tag and associated fluid extraction component. The RFID tag can be remotely powered or locally powered, i.e., either passive or active, respectively.

Base layer 302 additionally includes a power management device 310 configured to manage the power requirements of sensor 304, storage device 306, and RFID tag 308. The power management device may include a means of storing electrical energy, such as capacitors, so that energy may be made available in a controlled manner to other sub-systems when required, e.g., to the sensor(s), the control electronics or the communication sub-system. Base layer 302 may optionally include an external connector 312 configured to receive power from an external power source, such as a battery. External connector 312 allows for power to be supplied from a power supply external to sensor assembly 300 in lieu of or together with power supplied from a power generator located on sensor assembly 400, to be discussed below.

As discussed above, base layer 302 is illustrated as having a rectangular geometry. However, any geometry suitable for accommodating sensor 304, storage device 306, RFID tag 308, power management device 310, and, optionally, external connector 312, is envisioned. The illustrated arrangement of sensor 304, storage device 306, RFID tag 308, power management device 310, and, external connector 312 is merely for illustrative purposes and is not to scale. These components can be located on base layer 302 in any arrangement provided that the functionality of each component is maintained.

Figure 4:
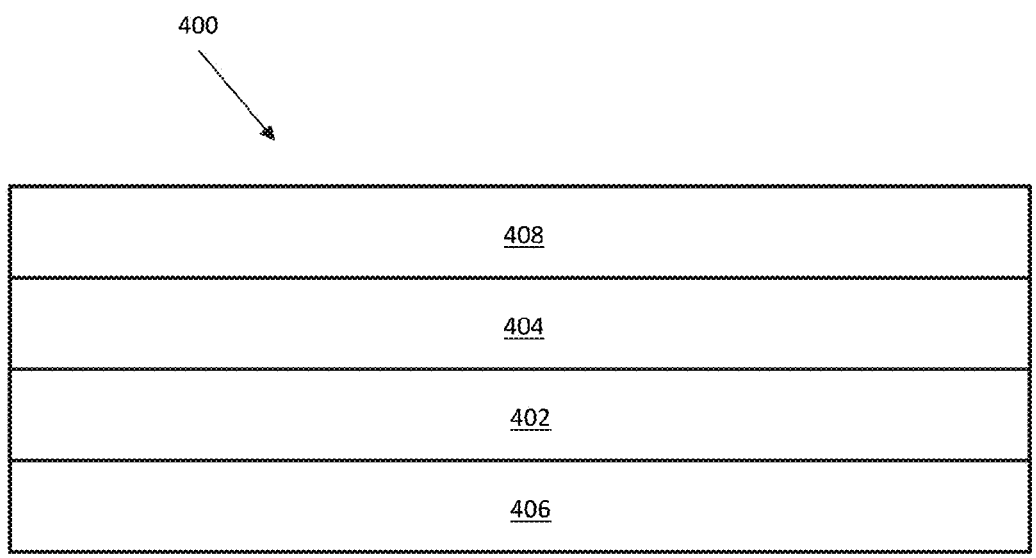
FIG. 4 is a schematic view of a sensor assembly.

Referring now to FIG. 4, a schematic view of a sensor assembly 400 is shown, by way of example. Sensor assembly 400 includes base layer 402, which is similar to base layer 302 discussed above. Sensor assembly 400 further includes a power generator layer 404 located on top of base layer 402, a coupling layer 406 located below base layer 402, and a protective layer 408 located on top of power generator layer 404.

Coupling layer 406 includes a coupling material suitable for coupling sensor assembly 400 to a fluid extraction component. Any material capable of maintaining contact between sensor assembly 400 and the fluid extraction component is appropriate for coupling layer 406. For instance, the coupling material could be an adhesive, magnet, or a combination thereof configured to adhere sensor assembly 400 to the fluid extraction component. In this arrangement, coupling layer 406 couples sensor assembly 400 to the fluid extraction component. In embodiments in which the coupling material is adhesive or magnetic, sensor assembly 400 is removably coupled to the fluid extraction component. That is, sensor assembly 400 can be coupled to a fluid extraction component, measure characteristics of the component, be removed from that component, and subsequently be coupled to another component for further measurements.

Above coupling layer 406 is the base layer 402. As discussed above, base layer 402 includes electrical components such as a sensor, storage device, RFID tag and antenna, and a power management device. Base layer 402 can optionally include an external power supply connector configured to receive power from a source external to sensor assembly 400. Once coupled to a fluid extraction component, base layer 402 provides for measurement and monitoring of the component by way of the electrical components.

Above base layer 402 is power generator layer 404 which includes piezoelectric material and electronics for routing produced power to the electrical components located on base layer 402. Non-limiting examples of suitable piezoelectric materials include crystals (such as quartz, Berlinite and Rochelle salt) and ceramics (such as Lead Zirconate Titanate (PZT), Barium Titanate and Lithium tantalate). However, any piezoelectric material capable of accumulating an electrical charge and producing electrical power in response to an applied mechanical stress can be used. The applied mechanical stress can result from, e.g., the hydrostatic pressure of seawater at depth when sensor assembly 400 is deployed subsea. The generator may also include a vibrating mechanical apparatus that responds to the hydrostatic pressure of seawater such that either ongoing or periodic vibration or excitation is applied to the piezoelectric material for continuity of electrical output. Such a vibration power generation ("VPG") device can utilize two inherent sources of vibration on a BOP. The first source being vibration of the entire assembly caused by the rotation of the drill string within the bore of the BOP. This imparts noise and vibration throughout the structure. The second source being when a component, such as a valve, is the item being measured by the RFID patch and in this case the nature of the actuation of the valve will give rise to impact vibrations that transmit through the body of the valve and can be harnessed by the VPG.

Above power generator layer 404 is protective layer 408. Protective layer 408 is exposed to the subsea environment which can be very hostile, particularly at great depth. Protective layer 408 can be configured to enclose the power generator layer 404 and base layer 402, thereby protecting them from the hostile subsea environment. Protective layer 408 can alternatively be configured to enclose all or any of the layers located on sensor assembly 400. By way of example, protective layer 408 could be made from stainless steel, super-duplex stainless steel and Polyether Ether Ketone (PEEK), or any combination thereof.

At significant depth, the subsea environment is at an elevated pressure and protective layer 408 is exposed to this pressure. Protective layer 408 is configured to withstand the elevated pressure to protect the power generator layer 404 and base layer 402, but still apply a stress to the power generator layer 404. As a result of the Piezoelectric Effect, the piezoelectric material generates an electrical charge in response to the stress.

The generated electrical charge can be passed via wires to any electrical components located in base layer 402. As discussed above, base layer 402 can include sensor 304, storage device 306, RFID tag 308, external connector 312, and any other components commonly used for storing and distributing electricity. Power generator layer 402 can fully power the electrical components of sensor assembly 400, or it can supply power together with an external power supply which can be coupled to base layer 402 via and external connector 312.

Figure 5:
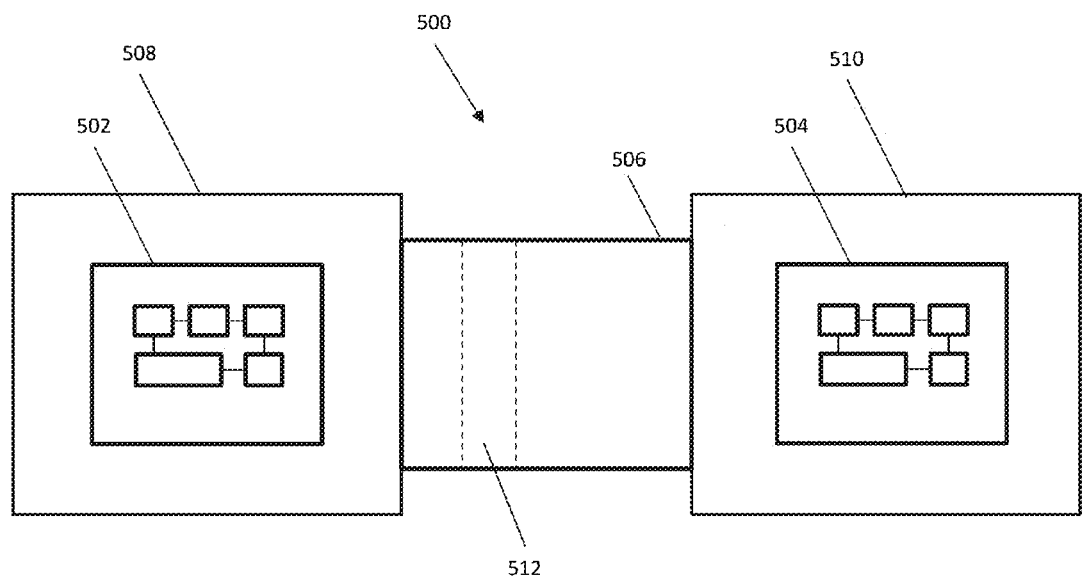
FIG. 5 is plan view of a fluid extraction component with sensor assemblies.

Turning now to FIG. 5, a schematic view of a valve 500 with sensor assemblies 502 and 504 is illustrated by way of example and not to scale. Only the base layers of sensor assemblies 502 and 504 are shown for ease of viewing. However, sensor assemblies 502 and 504 would include a coupling layer positioned between the base layer and bonnet body, and power generator and protective layer positioned on the opposite side of the base layer from the coupling layer.

Valve 500 includes a body 506 and bonnets 508 and 510 on either end of body 506. Valve 500 further includes a piston 512 located within body 506 and configured to move axially between a position in bonnet 508 and a position in bonnet 510. Sensor assembly 502 is similar to sensor assembly 400 described in FIG. 4 and is located on bonnet 508. Sensor assembly 504 is similar to sensor assembly 400 described in FIG. 4 and is located on bonnet 510.

Sensor assemblies 502 and 504 can include Hall-Effect sensors configured to detect the position of piston 512 as it moves between positions in bonnets 508 and 510. Depending on the position of piston 512, valve 500 can be in an open position allowing for fluid flow across the valve, or in a close position restricting fluid flow across the valve. Sensor assembly 502 is activated when piston 512 travels to a position within bonnet 508. Likewise, sensor assembly 504 is activated when piston 512 travels to a position within bonnet 510. In this way, sensor assemblies 502 and 504 provide information about the location of piston 512 within valve 500, thereby allowing for a determination of the flow control state (i.e., open or close) of the valve.

In addition to Hall Effect sensors, the base layers of sensor assemblies 502 and 504 can contain additional components. For instance, sensor assemblies 502 and 504 can further include pressure and/or temperature sensors for providing at-depth pressure and temperature measurements. Sensor assemblies can include acoustic devices to detect, characterize and monitor components by their acoustic signatures. Further, sensor assemblies 502 and 504 can also include strain sensors for determining strain experienced by valve 500. Sensor assemblies 502 and 504 can further include any other sensors known to those of ordinary skill in the art for providing information about the state of valve 500.

In addition to the embodiments described above, many examples of specific combinations are within the scope of the disclosure, some of which are detailed below:

EXAMPLE 1

A sensor assembly for monitoring a fluid extraction component, the sensor assembly comprising:
    a base layer including a coupling material and configured to be removably coupled to the fluid extraction component, the base layer comprising:
        a sensor configured to measure a characteristic of the fluid extraction component; and a communication device operatively coupled to the sensor, the communication device configured to wirelessly transmit the measured characteristic.

EXAMPLE 2

The sensor assembly of Example 1, further comprising a power generator layer coupled to the base layer and configured to provide power to at least one of the sensor and communication device.

EXAMPLE 3

The sensor assembly of Example 2, wherein the power generator layer comprises a piezoelectric material configured to generate electrical charge in response to a mechanical strain.

EXAMPLE 4

The sensor assembly of Example 2, further comprising an external power source configured to provide power to at least one of the sensor and communication device.

EXAMPLE 5

The sensor assembly of Example 2, further comprising a protective layer coupled to the power generator layer and configured to protect the base layer and power generator layer from an external environment.

EXAMPLE 6

The sensor assembly of Example 1, wherein the characteristic to be measured is at least one of temperature, pressure, and strain.

EXAMPLE 7

The sensor assembly of Example 1, wherein the sensor is at least one of a temperature sensor, a pressure sensor, and a strain sensor.

EXAMPLE 8

The sensor assembly of Example 1, wherein the fluid extraction component comprises a valve including a movable element therein.

EXAMPLE 9

The sensor assembly of Example 8, wherein the sensor is configured to detect the position of the movable element within the valve.

EXAMPLE 10

The sensor assembly of Example 9, wherein the sensor is a Hall Effect sensor.

EXAMPLE 11

The sensor assembly of Example 1, wherein the measured characteristic is wirelessly transmitted to a remote location including a receiver, wherein the remote location is at least one of a remotely operated subsea vehicle, an autonomous underwater vehicle, and a surface location.

EXAMPLE 12

A subsea drilling system comprising:
a subsea blowout preventer stack comprising a valve; and
a sensor assembly configured to be removably coupled to the fluid extraction component via a coupling material located on the sensor assembly, the sensor assembly comprising a sensor configured to measure a characteristic of the valve.

EXAMPLE 13

The subsea drilling system of Example 12, the sensor assembly further comprising a communication device operatively coupled to the sensor, the communication device configured to wirelessly transmit the measured characteristic.

EXAMPLE 14

The subsea drilling system of Example 12, the sensor assembly further comprising a power generator coupled to the sensor and configured to provide power to the sensor and communication device.

EXAMPLE 15

The subsea drilling system of Example 14, wherein the power generator layer comprises a piezoelectric material configured to generate electrical charge in response to a mechanical strain.

EXAMPLE 16

The subsea drilling system of Example 12, the sensor assembly further comprising a protective housing configured to protect the sensor from an external environment.

EXAMPLE 17

The subsea drilling system of Example 12, wherein the characteristic to be measured is at least one of temperature, pressure, and strain.

EXAMPLE 18

The subsea drilling system of Example 12, wherein the sensor is at least one of a temperature sensor, a pressure sensor, and a strain sensor.

EXAMPLE 19

The subsea drilling system of Example 12, wherein the valve comprises a movable element therein and wherein the sensor is configured to detect the position of the movable element within the valve.

EXAMPLE 20

The subsea drilling system of Example 13, wherein the measured characteristic is wirelessly transmitted to a remote location including a receiver, wherein the remote location is at least one of a remotely operated subsea vehicle, an autonomous underwater vehicle, and a surface location.

While the aspects of the present disclosure may be susceptible to various modifications and alternative forms, specific embodiments have been shown by way of example in the drawings and have been described in detail herein. It should be understood that the disclosure is not intended to be limited to the particular forms disclosed. Rather, the disclosure is to cover all modifications, equivalents, and alternatives falling within the spirit and scope of the disclosure as defined by the following appended claims.

I claim:

1. A sensor assembly for monitoring a fluid extraction component, the sensor assembly comprising:
   a base layer including a coupling material and configured to be removably coupled to the fluid extraction component;
   a sensor configured to measure a characteristic of the fluid extraction component; and
   a communication device operatively coupled to the sensor, the communication device configured to wirelessly transmit the measured characteristic.

2. The assembly of claim 1, further comprising a power generator layer coupled to the base layer and configured to provide power to at least one of the sensor and communication device.

3. The assembly of claim 2, wherein the power generator layer comprises a piezoelectric material configured to generate electrical charge in response to a mechanical strain.

4. The assembly of claim 2, further comprising a protective layer coupled to the power generator layer and configured to protect the base layer and power generator layer from an external environment.

5. The assembly of claim 1, further comprising an external power source configured to provide power to at least one of the sensor and communication device.

6. The assembly of claim 1, wherein the characteristic to be measured comprises at least one of temperature, pressure, and strain.

7. The assembly of claim 1, wherein the sensor comprises at least one of a temperature sensor, a pressure sensor, and a strain sensor.

8. The assembly of claim 1, wherein the fluid extraction component comprises a valve.

9. The assembly of claim 8, wherein the sensor is configured to detect an operational state of the valve.

10. The assembly of claim 9, wherein the sensor is a Hall Effect sensor.

11. The assembly of claim 1, wherein the measured characteristic is wirelessly transmittable to a remote location including a receiver, wherein the remote location is at least one of a remotely operated subsea vehicle, an autonomous underwater vehicle, and a surface location.

12. A subsea drilling or production system comprising:
   a subsea blowout preventer stack comprising a fluid extraction component; and
   a sensor assembly comprising:
      a coupling material configured to removably attach the sensor assembly to the fluid extraction component; and
      a sensor configured to measure a characteristic of the fluid extraction component.

13. The system of claim 12, the sensor assembly further comprising a communication device operatively coupled to the sensor, the communication device configured to wirelessly transmit the measured characteristic.

14. The system of claim 12, the sensor assembly further comprising a power generator coupled to the sensor and configured to provide power to the sensor and communication device.

15. The system of claim 14, wherein the power generator layer comprises a piezoelectric material configured to generate electrical charge in response to a mechanical strain.

16. The system of claim 12, the sensor assembly further comprising a protective housing configured to protect the sensor from an external environment.

17. The system of claim 12, wherein the characteristic to be measured comprises at least one of temperature, pressure, and strain.

18. The system of claim 12, wherein the sensor comprises at least one of a temperature sensor, a pressure sensor, and a strain sensor.

19. The system of claim 12, wherein the fluid extraction component comprises a valve including a movable element therein and wherein the sensor is configured to detect the position of the movable element within the valve.

20. The system of claim 13, wherein the measured characteristic is wirelessly transmittable to a remote location including a receiver, wherein the remote location is at least one of a remotely operated subsea vehicle, an autonomous underwater vehicle, and a surface location.

* * * * *